No. 898,369. PATENTED SEPT. 8, 1908.
F. E. IVES.
DIFFRACTION CHROMOSCOPE.
APPLICATION FILED MAR. 21, 1906.

2 SHEETS—SHEET 1.

Witnesses:
Willa A. Burrowes
Titus H. Ives

Inventor,
Frederic E. Ives,
by his Attorneys,

No. 898,369. PATENTED SEPT. 8, 1908.
F. E. IVES.
DIFFRACTION CHROMOSCOPE.
APPLICATION FILED MAR. 21, 1906.
2 SHEETS—SHEET 2.
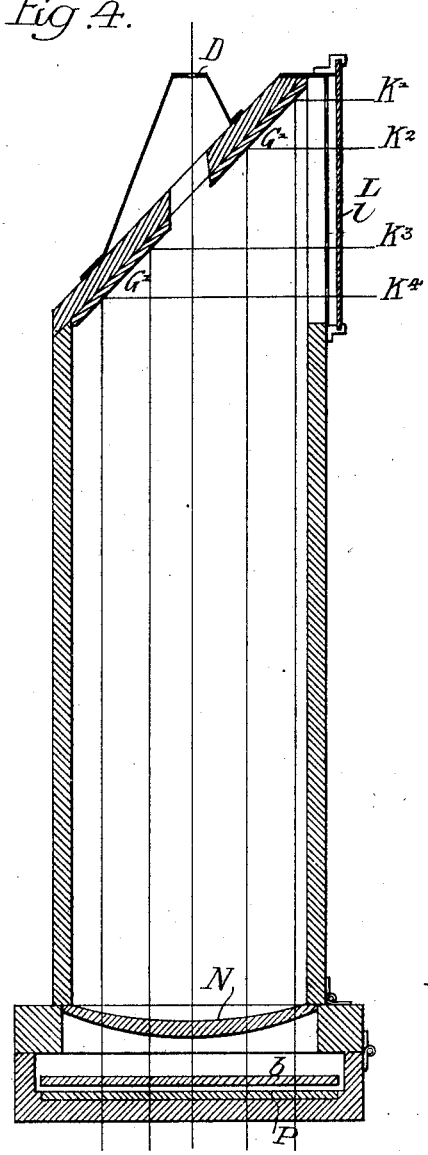
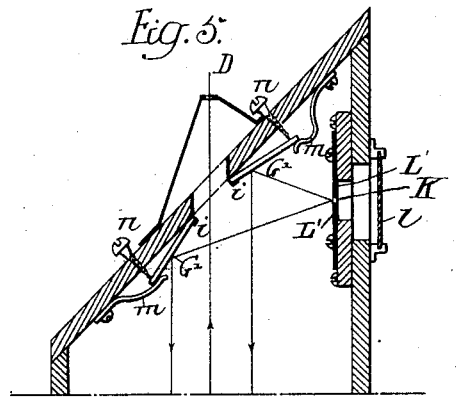
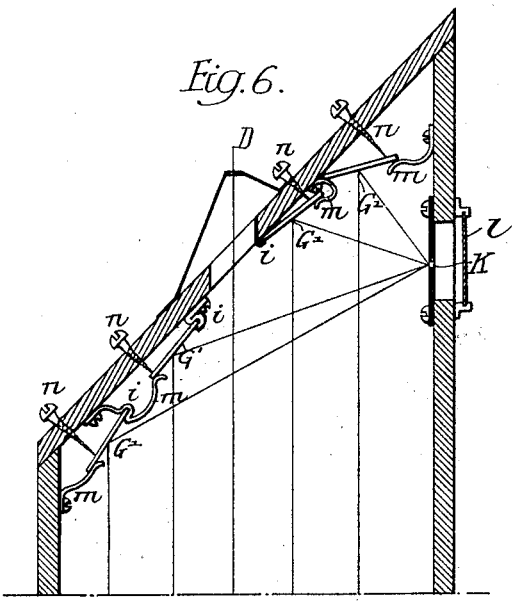
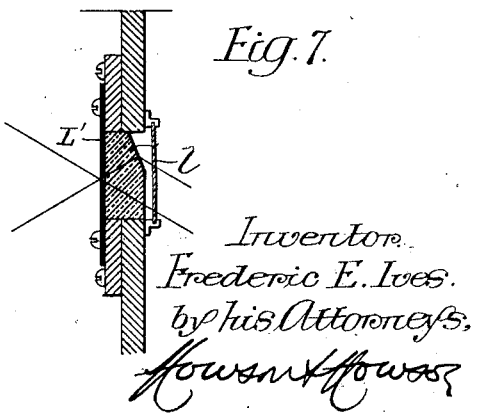

UNITED STATES PATENT OFFICE.

FREDERIC E. IVES, OF WEEHAWKEN, NEW JERSEY.

DIFFRACTION CHROMOSCOPE.

No. 898,369.  Specification of Letters Patent.  Patented Sept. 8, 1908.

Application filed March 21, 1906. Serial No. 307,215.

*To all whom it may concern:*

Be it known that I, FREDERIC E. IVES, a citizen of the United States, residing in Woodcliffe-on-Hudson, Weehawken, New Jersey, have invented an Improved Diffraction Chromoscope, of which the following is a specification.

Diffraction color photographs consist of three superposed or mixed images printed in fine diffraction lines in clear gelatin or albumen, to represent the three primary colors and their combinations. The spacing of the diffraction lines is different for the different color elements, say 2,000 lines to the inch for the red, 2,600 for the green, and 2,900 for the blue. Viewed by perfectly diffused transmitted light these photographs are quite invisible, but can be made visible with an approximation to the natural colors by viewing them in a special device with a point or line of light, a portion of which is dispersed and laterally displaced by the diffracting lines of the photograph, and focused upon the eye by means of a suitable lens. The source of light is usually a gas or lamp flame turned edgewise to the axis of the lens and at a distance of several feet from it. One objection to this device is that the color of a gas flame is not suitable for obtaining the best results and another is that some considerable skill is required to make the necessary adjustments, and they are lost again by a very slight disturbance of the instrument. Some of the diffraction photographs also require to be viewed by first order spectra and others by second order spectra in order to give the best results, and the necessary changes of adjustment are troublesome and likely to be very imperfectly performed by any but skilled experts.

The object of my invention is to so exhibit a diffraction color photograph that satisfactory illumination can be obtained either by artificial light or by diffused daylight, and incidentally to permit fixed adjustment and convenient disposition of the various instrumentalities necessary to such exhibition so that no skill is required in order to obtain successful results.

Figure 1:
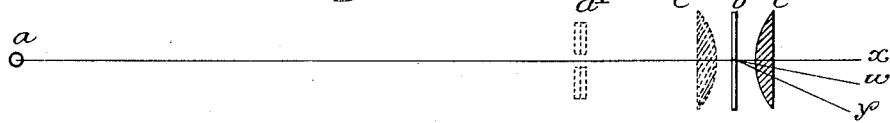
Figure 2:
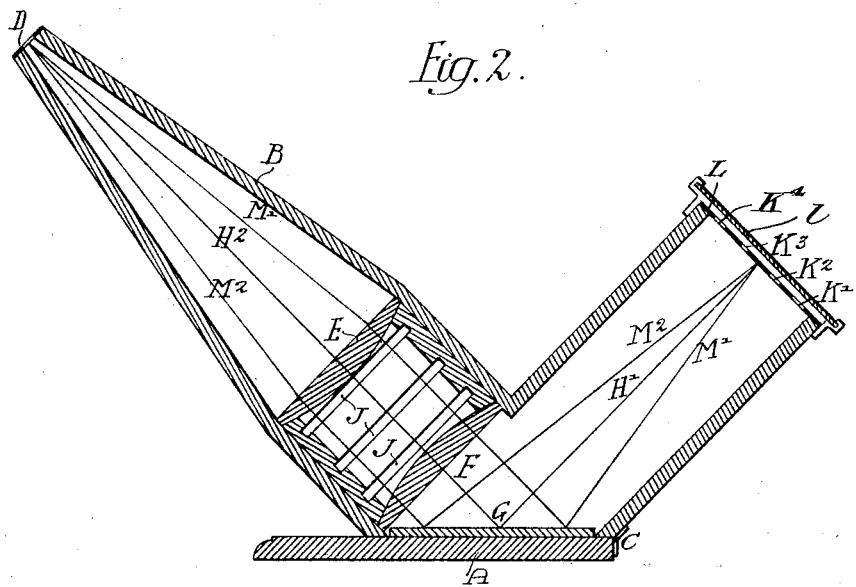
Figure 3:
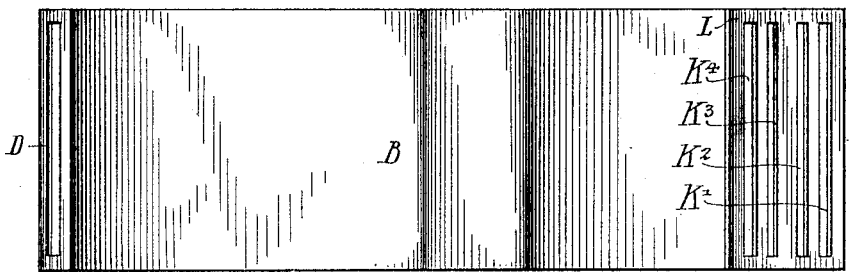

In the accompanying drawings, Figure 1 is a diagrammatic representation of means heretofore employed for exhibiting a diffraction color photograph; Fig. 2, is a longitudinal sectional view of a device for exhibiting such photographs in accordance with my invention; Fig. 3, is a plan view of the same; Fig. 4, is a longitudinal sectional view of another, and, in some respects, a preferable form of exhibiting device, and Figs. 5, 6 and 7, are views illustrating special constructions of part of the same.

In Fig. 1, of the drawing, $a$ represents a source of light, $b$ a diffraction photograph, $c$ a focusing lens, $x$ a position where the lens $c$ appears filled with white light, and $w$ a position where the graduated spectra of one order are suitably superposed and focused upon the eye, red spectrum rays from one grating photograph image, green from another and blue from the third, so that there appears to be a color photograph at $b$. At $y$ spectra of the second order may be similarly utilized. On the other side of the axis are similar spectra, either of which may be utilized. If the axis of the instrument is suitably displaced with respect to the position of $a$ the white light may be made to focus at $w$ and the superposed spectra at $x$ or the white at $y$ and the superposed second order spectra at $x$. A larger or closer source of light may be used by placing it behind a slit in an opaque screen, such as shown by dotted lines at $a'$, and inserting another lens such for instance, as shown by dotted lines at $c'$ to parallelize the rays, and this method of procedure would even admit of the use of diffused daylight, but for the fact that where spectra of only one order are utilized, as in the device described, diffused daylight does not give sufficiently strong illumination to be satisfactory.

I overcome the objections to the present procedure, first, by using multiple slits or sources of light so disposed as to utilize two or more of the spectra from each diffraction image, thus doubling, or even, under certain conditions, quadrupling the illumination, secondly, by attaching the slitted diaphragm to the viewing device so that the adjustments are fixed, and thirdly, by making a turn in the axis of the instrument, with a base line so disposed as to make the angles of illumination and vision more convenient and satisfactory.

In Fig. 2, of the drawings, A and B represent, respectively, the base and casing of the instrument, hinged together at C. D is a slit near the eyepoint, E and F are lenses, G is a mirror and the line H', is the normal optical axis. J are grooves for receiving the diffraction photograph slides and $K'$, $K^2$, $K^3$, $K^4$ are slits in an opaque screen L, attached to one end of the case. $M'$, $M^2$ are lines showing the form of a cone of normal axial rays on both sides of the lenses F and E, which are separated not only to permit of the insertion of the diffraction photograph, but in order to permit of changing its position to suit eyes having either long, normal or short sight, and this separation may possibly be reduced to some advantage in other respects. In the absence of a diffraction photograph between the lenses E and F, light entering the slot D would normally be focused upon the inside of the opaque diaphragm L at its center, and light passing in the other direction through the slits $K'$, $K^2$, $K^3$, $K^4$ would be thrown above or below the slit D, and so lost to vision. When, however, a diffraction photograph is inserted between the lenses E, F, the diffraction lines in the photograph, dispersing and deflecting light from D, would throw superposed spectra on all of the slits, $K'$, $K^2$, $K^3$, $K^4$ and, conversely, all of the first and second order spectra obtained from light coming through the slits $K'$, $K^2$, $K^3$, $K^4$, would be superposed at D. The diffraction photograph would therefore be seen by the light of four sets of spectra namely, first and second order spectra on each side, and the illumination would be greatly increased over that which would be obtained by utilizing only one set of spectra. If the slits $K'$, $K^4$ belonging to the second order spectra be made twice as wide as those belonging to the first order spectra, which is permissible, because the dispersion is twice as great, the illumination may possibly be quadrupled as compared with that obtained with one set of first order spectra. This arrangement possesses other advantages which may be less obvious, but are of considerable practical importance. For example, some of the diffraction photographs throw more light into the second order spectra than into the first, and vice versa, and sometimes the diffraction lines belonging to one of the superposed or mixed images act differently in this respect from those belonging to the others, and sometimes one side or portion of the diffraction photograph acts differently in this respect from the other side or portion. The mixing of the several spectra corrects errors thus introduced into single spectrum images, and makes the reproduction not only more brilliant, but more correct and harmonious.

In addition to the advantages already enumerated, the use of slits horizontally disposed and of appropriate length, or appropriately spaced, together with diffraction photographs having the diffraction lines horizontally disposed, permits the images to be viewed with both eyes at once, and I believe that binocular vision with the eyes on opposite sides of the normal axis of a diffraction photograph viewing device is also a new and valuable improvement. The bend in the axis of the light rays provides for the convenient use of a window or other source of light, as well as for convenient viewing of the images.

My improved viewing instrument, while calculated to operate most successfully in diffused daylight, may be very satisfactorily used with artificial light by placing it near the source of light, with a ground glass over the diaphragm L, and the color of the light may be modified and improved by adding also a pale cobalt blue glass $l$ or other modifying screen.

The instrument shown in Fig. 4, has for its object greater simplicity and compactness of construction, and increased illumination of the diffraction photograph images. In this instrument is employed a lens N, preferably a convex meniscus, with the concave curve on a radius corresponding to the focal distance. This lens serves to focus both the eye slit D and the spectrum slits $K'$, $K^2$, $K^3$ and $K^4$. A plane mirror P is placed behind the diffraction photograph $b$, and a divided or two-part plane mirror, inclined at an angle of 45°, is employed behind the spectrum slits, as shown at $G^a$, the rays of light passing to the eye slit between the two parts or sections of said mirror. By this means the second lens and the extension of the case are eliminated, and other important advantages are obtained, thus, in the instrument shown in Fig. 2, only a comparatively small portion of the light incident on a diffraction photograph is diffracted, whereas in the instrument shown in Fig. 4, the light passes twice through the photograph, and the total amount of light diffracted is increased by considerably more than fifty per cent. Viewed axially the images are so perfectly superposed as to appear as a single sharp image, even when the diffraction photograph and mirror are considerably separated, because the light rays are parallel to each other to and from the lens N on the side of the mirror P. When the diffraction photograph and the mirror are separated, however, and the compound image is viewed other than axially, as with binocular vision from two sides of the axis, said image appears doubled in outline, hence, in order to obtain binocular vision with practical coincidence of images, the glass of the mirror P is made quite thin, usually about one millimeter thick, and the diffraction photograph, without cover glass, is laid face downward upon it, with only paper or very thin metal separators, under which conditions doubling of outline, seen with binocular vision, is negligible, and when the diffraction photographs are made to mix the primary colors by juxtaposed colored lines it is found that the linear structure is much less noticeable than when only a single image is formed, as in the instrument shown in Fig. 1, and this is also an important gain. In an instrument of this type I may use a diaphragm L' with but a single spectrum slit, such for instance as shown at K in Fig. 5, the rays of light from this slit being reflected by mirrors G' disposed on opposite sides of the eye slit, and preferably susceptible of angular adjustment, as for instance by hinging them at $i$, and pressing the same in one direction by means of springs $m$ and in the other direction by means of adjusting screws $n$, this arrangement providing for the utilization of right and left spectra with a single slit, and, if desired, a plurality of adjustable mirrors G' may be employed on each side of the eye slit, as shown in Fig. 6, for the utilization of spectra of different orders. When the source of light is concentrated, as for instance when it is derived from a gas burner, an electric arc light, or the like, it may be advisable to refract certain of the rays so as to properly direct them to the mirrors on opposite sides of the eye slit, and for this purpose a suitable refracting device in front of the diaphragm L' may be used, the device preferred for this purpose being a prism, such, for instance, as shown at S, in Fig. 7.

In an instrument of the character shown in Figs. 5 and 6, the mirrors G' may be regarded as duplicators of the single slit K, since the reflected rays from the separate inclined mirrors are parallel to each other, exactly as the reflected rays from separate slits in Fig. 4, and this arrangement is therefore an optical equivalent to that shown in Fig. 4, for the production of superposed spectra at the eye slit D.

I claim:—

1. A diffraction color photograph viewing device having a plurality of separated sources of light disposed to superpose at the view point two or more of the spectra belonging to each diffraction ruling.

2. A diffraction color photograph viewing device having a plurality of separated sources of light, disposed to superpose at the view point right and left spectra belonging to each diffraction ruling.

3. A diffraction color photograph viewing device having a plurality of separated sources of light disposed to superpose at the view point spectra of two or more orders belonging to each diffraction ruling.

4. A diffraction color photograph viewing device having a diaphragm with a plurality of slits disposed to superpose at the view point two or more of the spectra belonging to each diffraction ruling.

5. A diffraction color photograph viewing device having a diaphragm with a plurality of slits disposed to superpose at the view point right and left side spectra belonging to each diffraction ruling.

6. A diffraction color-photograph viewing device having a diaphragm with a plurality of slits disposed to superpose at the view point spectra of two or more orders belonging to each diffraction ruling.

7. A diffraction color-photograph viewing device having slits for first and second order spectra, those for the second order spectra being of the greater area.

8. A diffraction color-photograph viewing device having horizontal slits of such length or spacing as to permit of binocular vision of a single tri-color image.

9. A diffraction color-photograph viewing device having a viewing end, a light receiving opening, and a mirror disposed therebetween to bend the optical axis.

10. A diffraction color-photograph viewing-device having a viewing end, means for receiving a photograph, and a mirror serving as a backing for said photograph, said mirror being disposed in a plane parallel to said photograph so that light passes twice through the photograph before reaching the eye.

11. A diffraction color-photograph viewing device having a mirror serving as a backing for the photograph and having another mirror disposed to bend the optical axis.

12. A diffraction color-photograph viewing device having an eye slit, and mirrors disposed to bend the optical axis, and separated to permit passage between them of the rays of light to the eye slit.

13. A diffraction color-photograph viewing device having an eye slit, a mirror serving as a backing for the photograph, and mirrors disposed to bend the optical axis and separated to permit passage between them of the rays of light to the eye slit.

14. A diffraction color-photograph viewing device having an eye slit, a mirror serving as a backing for the photograph, and mirrors disposed to bend the optical axis and direct separated supplies of light to the photograph, said mirrors being separated so as to permit of the passage between them of rays of light to the eye slit.

15. A diffraction color-photograph viewing device having a mirror disposed to bend the optical axis, said mirror being adjustable to vary its angle.

16. A diffraction color-photograph viewing device having an eye slit, a mirror serving as a backing for the photograph, and mirrors disposed to bend the optical axis, said mirrors being separated to permit the passage between them of rays of light to the eye slit and being also adjustable to vary their angle.

In testimony whereof, I have signed my name to this specification, in the presence of two subscribing witnesses.

FREDERIC E. IVES.

Witnesses:
HERBERT O. PRENTICE,
LLEWELLYN WATTS.